Patented Mar. 7, 1944

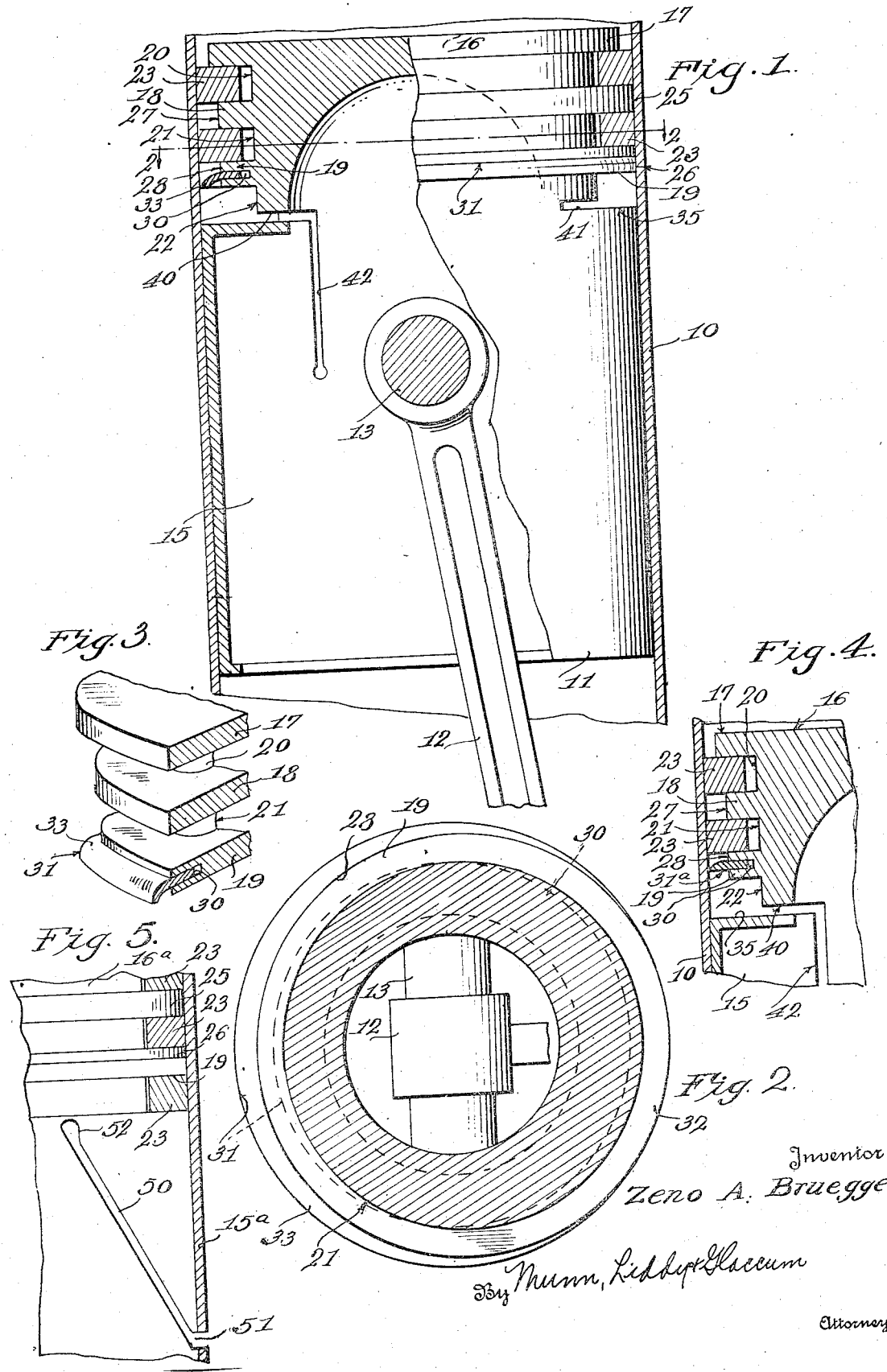

2,343,530

UNITED STATES PATENT OFFICE 2,343,530

PISTON

Zeno Arno Bruegger, Boise, Idaho

Application August 25, 1942, Serial No. 456,055

17 Claims. (Cl. 309—5)

This invention relates to improvements in pistons.

An object of the invention is the provision of a piston having spaced lands at the crown portion thereof with the uppermost land being disposed concentric with respect to the longitudinal axis of the piston while other lands are eccentric with respect to the longitudinal center line, one of the lands having an annular groove to receive a scraper in the form of a ring which has its outer periphery in contact with the cylinder walls.

Another object of the invention is the provision of a piston which has certain of its spaced lands disposed eccentrically with respect to the longitudinal center line of the piston, one of the lands being provided with an annular groove to receive an oil scraper which has its outer periphery in contact with the inner walls of the cylinder in which the piston operates, said scraper being in the form of a narrow ring.

A further object of the invention is the provision of a piston having lands at the crown portion thereof in which certain of the lands have their peripheries disposed in eccentric relation with respect to the longitudinal axis of the piston, one of such lands being provided with an annular groove to receive an oil scraper in the form of a ring with the outer periphery of the ring being in contact with the walls of the enclosing cylinder, said piston being provided with a slit at points adjacent the major thrust of the piston.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in elevation of a piston and cylinder constructed according to the principles of my invention, with parts in section.

Figure 2 is a horizontal section taken along the line 2—2 of Fig. 1.

Figure 3 is a fragmentary view in perspective and partly in section of the piston adjacent the lands.

Figure 4 is a fragmentary vertical section of a piston showing another form of the oil baffle.

Figure 5 is a fragmentary view in elevation of the piston showing a modified form of the piston and expansion slot in the skirt.

Referring more particularly to the drawing, 10 designates a cylinder of an internal combustion engine in which is mounted for reciprocation a piston 11 which operates a connecting rod 12 attached at one end to a crank pin 13 carried by the piston 11 while the other end of the connecting rod is attached to the usual crank of the shaft of the engine. In view of the fact that the connecting rod and the pin 13, together with the other necessary parts of an engine form no part of the present invention, no details of these elements are shown and described.

The piston 11 is composed of the usual apron 15 and a crown portion generally designated by the numeral 16. The crown portion consists of a plurality of lands 17, 18 and 19 which are spaced apart by the respective grooves 20, 21 and 22. The grooves are adapted to receive any well known form of ring as shown at 23. However, the ring has been eliminated from the groove 22 so that the construction of the piston at this point will not be obscured.

As shown, the periphery of the land 17 may be disposed concentric with respect to the longitudinal axis of the piston. It will be noted that the outer wall of said land is spaced from the walls of the cylinder 10 in order to prevent it from striking against the usual projection of metal at the top end of cylinder. Such projection is formed by the uppermost piston ring because said ring does not wear away the cylinder evenly all the way to the very top end of stroke.

Lands 18 and 19 have their peripheral walls disposed eccentric with respect to the longitudinal center of the piston 11. In view of this the portions 25 and 26 respectively of the lands 18 and 19 are in contact with the cylinder walls or are approximately so, and due to the eccentric alinement of the faces of these lands said faces progressively recede from the cylinder walls until they reach a diametrically opposite point as shown at 27, 28, where the lands are spaced the widest extent from the cylinder walls. It will be noted from this construction that lands 18 and 19 at the points indicated by the numeral 25 and 26 contact the wall of the cylinder 10 at points of the minor thrust of the piston while the diametrically opposite points of the lands as indicated by the numerals 27 and 28 are spaced from the walls of the cylinder at the major thrust point of the piston. However, the rings 23 are in engagement with the cylinder wall throughout their external periphery.

One or more of the lands are provided with narrow annular grooves and in this instance the land 19 is illustrated as having the annular groove 30.

An oil scraper generally designated by the numeral 31 is in the form of a very narrow split ring and is received within the groove 30. Said ring may be curved downwardly or inwardly toward the apron 15, to provide an overhang 33. While the ring is shown in Figs. 1 to 3 inclusive as being curved where it extends beyond the periphery of the land 19 it may be substantially flat as shown in Fig. 4. The ring is expanded in the groove so that its outer periphery will be in contact with the wall of the cylinder whereby when the piston 11 is on its downward stroke the oil will be scraped off the walls of the cylinder and be forced downwardly toward the annular shoulder 35 of the ring groove 22.

Referring more particularly to Fig. 1 it will be seen that the slots 40 and 41 are formed in the piston wall and these slots are curved and extend horizontally beneath the portion of the crown of the piston adjacent the ring groove 22. Extending downwardly from the curved slot 40 is a vertical slot or slots 42 for taking care of the expansion of the piston. This slot is located adjacent the major thrust side of the piston and diametrically opposite of the points where the lands 18 and 19 contact the cylinder wall. Furthermore, the slot 42 is located adjacent the major thrust side of the piston so that when the lands 18 and 19 expand under heat the slot 42 will tend to relieve any such excessive expansion at a diametrically opposite point and thus prevent jamming of the piston in the cylinder. The lands 18 and 19 contact the cylinder wall as indicated on the right side in Fig. 1 and such contact between the lands and cylinder wall acts as a support for the skirt. In view of the fact that the piston expands and such expansion cannot be taken care of at the points of contact between the piston and cylinder walls, provision for the needed expansion relief is made on the left side of the piston or at the major thrust of said piston.

While the piston is normally cool the ring lands will be approximately in line with the piston skirt on the right side as shown in Fig. 1 but when the piston has reached its normal running temperature the heated lands may have expanded to a greater extent than the skirt section, thereby relieving the skirt from much of its collapsing strain. However, increased expansion of the lands on the right hand side is compensated for by the spacing of diametrically opposite points of the land from the cylinder walls and by the slitting of the piston as indicated at 40 and 42.

Referring more particularly to Fig. 4 it will be seen that the same reference numerals are employed in this figure as are used to indicate identical parts in Figs. 1 to 3 with the exception of the designation 31a which represents another form of the oil scraper ring. In this case the ring 31a is substantially flat with its outer periphery contacting the cylinder walls when the ring is expanded in the groove 30 formed in the land 19. One or more of such rings may be used in a groove to provide an overlapping joint.

In the modified form shown in Fig. 5 the slot 50 extends from a point in the piston, when the skirt 15a merges into the piston head 16a downwardly on a bias to a point 51 in the skirt. The upper end of the slot is enlarged as shown at 52.

It will be noted that the horizontal slot 41 of Fig. 1 is eliminated so that greater strength is provided at the shoulder 35 where the groove 22 is formed. However, a horizontal slot may extend from the end 51 of the slot 50.

This type of slotting provides for a more efficient cooling medium for the piston head since the increased head portion of the piston gives a much larger area of wall contact between the piston and the water-cooled cylinder. The remaining parts of the piston are identical in structure with the corresponding parts shown in Fig. 1. By shifting the ring land center to the right as shown in Fig. 1 a complete piston length contact is provided on this right side, while the head diameter remains the same as is in the usual type of piston to provide the correct amount of clearance where the piston is heated.

In other words the particular construction provides a piston which bears against the right side of its thrust face on its entire length instead of only up to the bottom of the ring land offset. By this construction the piston provides contact on the ring lands and also on the rings.

I claim:

1. The combination with a cylinder, of a piston movable in said cylinder and provided with a plurality of spaced lands at the crown portion thereof, the uppermost land having the periphery thereof spaced from the side walls of the cylinder and having the same vertical axis as the piston skirt, other lands being disposed eccentrically with respect to the longitudinal axis of the piston skirt so that the vertical axis of the other lands will be at one side of the vertical axis of the piston skirt and first-mentioned lands.

2. The combination with a cylinder, of a piston movable in said cylinder and provided with a plurality of spaced lands at the crown portion thereof, the vertical axis of the lands being located at one side of the vertical axis of the piston skirt.

3. The combination with a cylinder, of a piston movable in said cylinder and provided with a plurality of spaced lands at the crown portion thereof, the uppermost land having the periphery thereof spaced from the side walls of the cylinder, other lands being disposed eccentrically with respect to the longitudinal axis of the piston skirt, at least one of the lands being provided with an annular groove, an oil scraper in the form of a ring mounted in the groove and having its outer periphery bearing against walls of the cylinder.

4. The combination with a cylinder, of a piston movable in said cylinder and provided with a plurality of spaced lands at the crown portion thereof, the uppermost land having the periphery thereof spaced from the side walls of the cylinder, other lands being disposed eccentrically with respect to the longitudinal axis of the piston skirt, the piston skirt having a longitudinal slot diametrically opposite the cylinder contacting portions of the lands, terminating in a horizontal slot at its upper end.

5. The combination with a cylinder, of a piston movable in said cylinder and provided with a plurality of spaced lands at the crown portion thereof, the uppermost land having the periphery thereof spaced from the sidewalls of the cylinder, other lands being disposed eccentrically with respect to the longitudinal axis of the piston skirt, one of the lands being provided with an annular groove, and an oil scraper in the form of a split ring mounted in the groove and having the outer periphery in contact with the walls of the cylinder, the ring being curved transversely at points where the ring projects beyond the periphery of the associated land.

6. The combination with a cylinder, of a piston movable in said cylinder and provided with a plurality of spaced lands at the crown portion thereof, one at least of the lands being disposed eccentrically with respect to the longitudinal axis of the piston skirt, the other lands being provided with an annular groove, and an oil scraper in the groove in the form of a split ring, the outer periphery of which being concentric to said axis and in contact with the cylinder walls.

7. In a piston and cylinder arrangement of an internal combustion engine in which one of the spaced lands has an annular groove therein, an oil scraper in the form of a ring located in the groove and having its outer periphery in contact with the cylinder walls, said ring having a portion thereof overhanging the supporting land.

8. In a piston and cylinder arrangement of an internal combustion engine in which one of the spaced lands has an annular groove therein, an oil scraper in the form of a ring located in the groove and having its outer periphery in contact with the cylinder walls.

9. The combination with a cylinder, of a piston movable in said cylinder and provided with a plurality of spaced lands at the crown portion thereof, the uppermost land being concentric with respect to the skirt and having the periphery thereof spaced from the side walls of the cylinder, other lands being disposed eccentrically with respect to the longitudinal axis of the piston skirt.

10. The combination with a cylinder, of a piston movable in said cylinder and provided with a plurality of spaced lands at the crown portion thereof, the uppermost land having the periphery thereof spaced from the side walls of the cylinder, other lands being disposed eccentrically with respect to the longitudinal axis of the piston skirt, the eccentric lands contacting at points with the cylinder, the piston skirt having a longitudinal slot diametrically opposite the cylinder-contacting portions of the lands, terminating in a horizontal slot at its upper end.

11. The combination with a cylinder, of a piston movable in said cylinder and provided with a plurality of spaced lands at the crown portion thereof, said lands being disposed eccentrically with respect to the longitudinal axis of the piston skirt, at least one of the lands being provided with an annular groove, an oil scraper in the form of a ring mounted in the groove and having its outer periphery bearing against walls of the cylinder.

12. The combination with a cylinder, of a piston movable in said cylinder and provided with a plurality of spaced lands at the crown portion thereof, said lands being disposed eccentrically with respect to the longitudinal axis of the piston skirt, one of the lands being provided with an annular groove, and an oil scraper in the form of a split ring mounted in the groove and having the outer periphery in contact with the walls of the cylinder, the ring being curved transversely at points where the ring projects beyond the periphery of the associated land.

13. The combination with a cylinder, of a piston movable in said cylinder and provided with a plurality of spaced lands at the crown portion thereof, said lands being disposed eccentrically with respect to the longitudinal axis of the piston skirt, the eccentric lands contacting at points with the cylinder, the piston skirt having a longitudinal slot diametrically opposite the cylinder-contacting portions of the lands, terminating in a horizontal slot at its upper end.

14. The combination with a cylinder, of a piston movable in said cylinder and provided with a plurality of spaced lands at the crown portion thereof, said lands being disposed eccentrically with respect to the longitudinal axis of the piston skirt, at least one of the lands being provided with an annular groove, an oil scraper in the form of a ring mounted in the groove and having its outer periphery bearing against walls of the cylinder, the eccentric lands contacting at points with the cylinder, the piston skirt having a longitudinal slot diametrically opposite the cylinder-contacting portions of the lands, terminating in a horizontal slot at its upper end.

15. The combination with a cylinder, of a piston movable in said cylinder and provided with a plurality of spaced lands at the crown portion thereof, said lands being disposed eccentrically with respect to the longitudinal axis of the piston skirt, one of the lands being provided with an annular groove, and an oil scraper in the form of a split ring mounted in the groove and having the outer periphery in contact with the walls of the cylinder, the ring being curved transversely at points where the ring projects beyond the periphery of the associated land, the eccentric lands contacting at points with the cylinder, the piston skirt having a longitudinal slot diametrically opposite the cylinder-contacting portions of the lands, terminating in a horizontal slot at its upper end.

16. The combination with a cylinder, of a piston movable in said cylinder and provided with a plurality of spaced lands at the crown portion thereof, one at least of the lands being disposed eccentrically with respect to the axis of the piston skirt, said skirt having an expansion slot in the side wall thereof extending downwardly on a bias from a point adjacent the upper end of the skirt to an intermediate portion of said skirt.

17. The combination with a cylinder, of a piston movable in said cylinder, and provided with a plurality of spaced lands at the crown portion thereof, said piston having an expansion slot in the side wall thereof extending downwardly from a point adjacent to the upper end of the skirt, and terminating in a horizontal slot at an intermediate portion of the skirt.

ZENO ARNO BRUEGGER.